Figure 1:
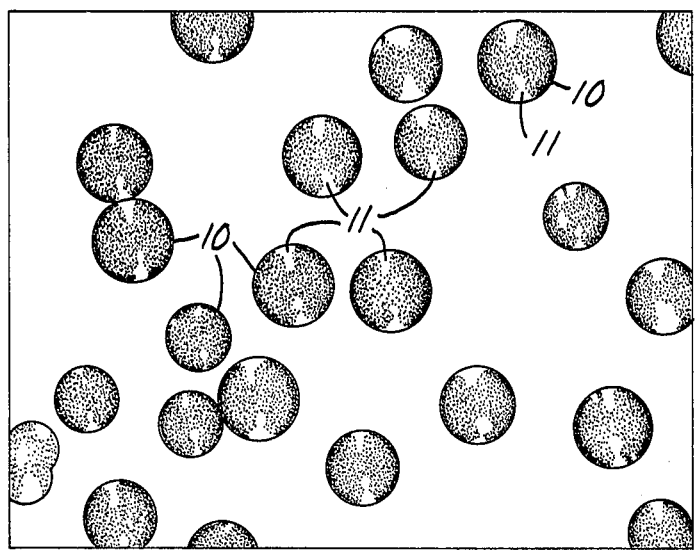

United States Patent [19]

Lange et al.

[11] 4,166,147

[45] Aug. 28, 1979

[54] SHAPED AND FIRED ARTICLES OF TiO$_2$

[75] Inventors: Roger W. Lange; Harold G. Sowman, both of Maplewood, Minn.

[73] Assignee: Minnesota Mining and Manufacturing Company, St. Paul, Minn.

[21] Appl. No.: 351,285

[22] Filed: Apr. 16, 1973

[51] Int. Cl.$^2$ .................. C04B 35/00; C08K 3/22; C09C 1/36

[52] U.S. Cl. ........................ 428/328; 106/50; 106/48; 106/57; 106/73.3; 106/73.33; 106/300; 423/610; 252/310; 252/317; 264/15; 264/176 F; 264/204; 428/404; 428/407

[58] Field of Search ............. 106/73.3, 50, 300, 57, 106/48, 73.33; 264/15, 204, 176 F; 423/610; 252/310, 317; 428/328, 404, 407

[56] References Cited

U.S. PATENT DOCUMENTS

| | | | |
|---|---|---|---|
| 2,332,424 | 10/1943 | Zwermann | 106/48 |
| 3,180,741 | 4/1965 | Wainer et al. | 106/73.3 |
| 3,244,639 | 4/1966 | Mindick et al. | 106/50 UX |
| 3,311,689 | 3/1967 | Kelsey | 106/73.3 |
| 3,385,915 | 5/1968 | Hamling | 106/50 |
| 3,409,429 | 11/1968 | Ekman | 423/610 X |
| 3,460,956 | 8/1969 | Dahle | 423/610 X |
| 3,704,147 | 11/1972 | Hardy et al. | 106/57 |
| 3,709,706 | 1/1973 | Sowian | 106/57 |

FOREIGN PATENT DOCUMENTS 1000227 8/1965 United Kingdom .................. 106/73.3

OTHER PUBLICATIONS

Kirk-Othmer, Encyclopedia of Chemical Technology, vol. 20, p. 393.
Schroeder, H., "Physics of Thin Films"—Edited Hass t Thun—vol. 5 (1969), Academic Press—"Oxide Layers Deposited from Organic Solutions", pp. 87-141, pp. 105 and 107.

Primary Examiner—John F. Niebling
Attorney, Agent, or Firm—Cruzan Alexander; Donald M. Sell; William G. Ewert

[57] ABSTRACT

Solid, shaped and fired refractory articles, such as fibers and microspheres, of titanium dioxide are made by shaping, gelling, and firing titania sols. Said fibers can be made by extruding in air a viscous aqueous titania sol, and heating and firing the resulting green fiber to remove water, decompose and volatilize undesired constituents, and form a refractory fiber of polycrystalline titanium dioxide, which is useful, for example, to form refractory fabrics or as reinforcement for composites. Said microspheres can be made by dispersing droplets of an aqueous titania sol in an organic dehydrating liquid, separating the resulting green microspheres from the dehydrating liquid, and heating and firing the green microspheres to form solid refractory microspheres of polycrystalline titanium dioxide, which are useful, for example, in reflective signs or traffic marking surfaces. Said fired fibers and microspheres are preferably transparent to visible light with the titanium dioxide content thereof in its anatase form.

28 Claims, 3 Drawing Figures

SHAPED AND FIRED ARTICLES OF TiO$_2$

This invention relates to solid, shaped refractory articles of polycrystalline titanium dioxide, such as fibers and microspheres, and articles made therefrom such as textiles and composites. In another aspect, it relates to continuous, transparent, strong, flexible refractory fibers of polycrystalline anatase titanium dioxide. In another aspect, it relates to solid, uniformly shaped, transparent refractory microspheres of polycrystalline anatase titanium dioxide. In another aspect, it relates to processes for the preparation of said shaped refractory articles. In still a further aspect, it relates to an aqueous mixture or sol of titania, which mixture or sol can be shaped, dehydratively gelled, and fired to form solid, shaped, transparent, strong polycrystalline anatase titanium dioxide articles, such as fibers and microspheres.

Within the last decade, a number of patents have been issued and other literature published describing various polycrystalline, microcrystalline, or non-vitreous fibers and other shaped articles of refractory metal oxides made by various non-melt processes, such as by drying films of solutions of oxygen-containing metal compounds, or drying organic polymeric bodies, such as cellulose or rayon, impregnated with such a solution, or by extruding and drawing, or spinning, viscous fluids of such metal compounds into fibers, followed by heating to remove water, organic material, and other volatile material to produce a refractory article. A recent review of the state of the art of polycrystalline inorganic fibers appears in Chapter 8 of "Modern Composite Materials" edited by Brautman and Krock, published by Addison-Wesley Pub. Co., Reading, Mass. (1967). Other art in this area is Netherlands Pat. No. 7,015,245, British Pat. No. 1,287,288, U.S. Pat. Nos. 3,385,915, 3,632,709, 3,663,182 and the art cited in U.S. Pat. No. 3,709,706.

Shaped and fired, non-vitreous inorganic or metal oxide fibers are still in the relatively early stage of development. In many technologies, there is a need for a relatively inexpensive refractory fiber product, and other relatively minute shaped refractory articles, with desirable physical properties, such as transparency, high strength, high modulus of elasticity, chemical resistance, high reflectivity, and the retention of such properties at high temperatures.

Briefly, the refractory products of this invention are solid, shaped and fired, non-vitreous refractory articles having predetermined shapes in at least two dimensions, such as fibers and microspheres, comprising predominantly (i.e., greater than 50 weight percent, e.g., 60 weight percent and greater) polycrystalline TiO$_2$, preferably in its anatase form. These products are made by a non-melt process comprising shaping in at least two dimensions and dehydratively or evaporatively gelling a liquid mixture or sol of titania or a titanium compound, such as tetraisopropyl titanate, calcinable in air to TiO$_2$, to form a "green" or non-refractory amorphous shaped article, such as a fiber or microsphere, and heating and firing the shaped green article to remove water, decompose and volatilize undesired constituents and convert it into said refractory article.

Shaped and fired refractory fibers of this invention can be made by extruding in air a viscous, fiberizable concentrate of said mixture or sol and then heating and firing the resulting green fibers to form continuous, uniformly round or oval, strong, flexible, smooth, glossy refractory fibers of polycrystalline titanium dioxide, said fibers preferably having the titanium dioxide in its anatase form and being transparent to visible light, said fibers being useful in making refractory textile fabric or as fillers or reinforcement for plastic composites. Solid, refractory microspheres of this invention are made by dispersing droplets of said mixture or sol in an organic dehydrating liquid, such as 2-ethyl-1-hexanol, in which said droplets are immiscible, separating the resulting green microspheres and then heating and firing them to form uniformly round, smooth, solid, strong, glossy, refractory microspheres of polycrystalline titanium dioxide, these shaped and fired spheres also preferably having the titanium dioxide content in its anatase form and being transparent to visible light, said spheres being useful, for example, in making reflective signs or traffic marking surfaces or as fillers or reinforcement for plastic composites.

The terms "dehydrative gelling" or "evaporative gelling," as used herein, means that sufficient water and volatile material are removed from the shaped green articles (e.g., the green fibers or microspheres) so that the form or shape of the article is sufficiently rigid to permit handling or processing without significant loss or distortion of the desired form or shape. Therefore, all the water in the shaped article need not be removed. Thus, in a sense, this step can be called partial dehydrative gelling. The shaped articles in their green form are generally transparent to visible light and clear (or perhaps slightly hazy) under an optical microscope. In the case of fibers, unless coloring additives are included in the viscous concentrate, the green fibers appear to look like colorless glass fiber. The solidified gel articles of this invention in their green form are amorphous, i.e., X-ray analysis does not show the presence of any crystalline species.

Figure 2:
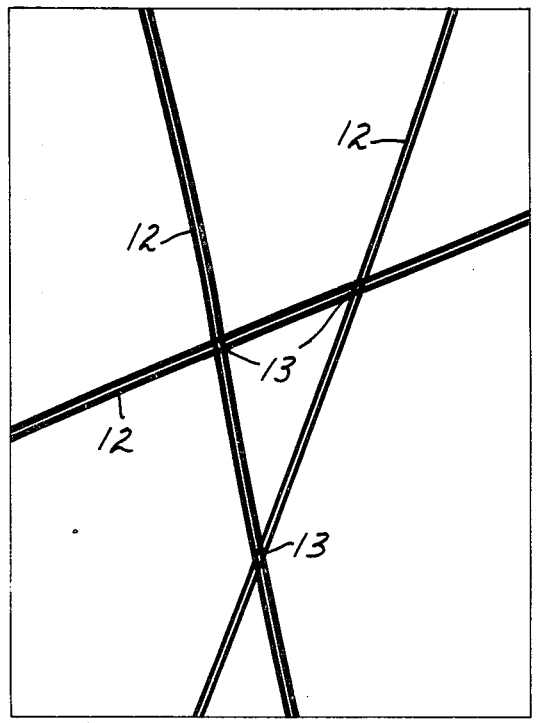
Figure 3:
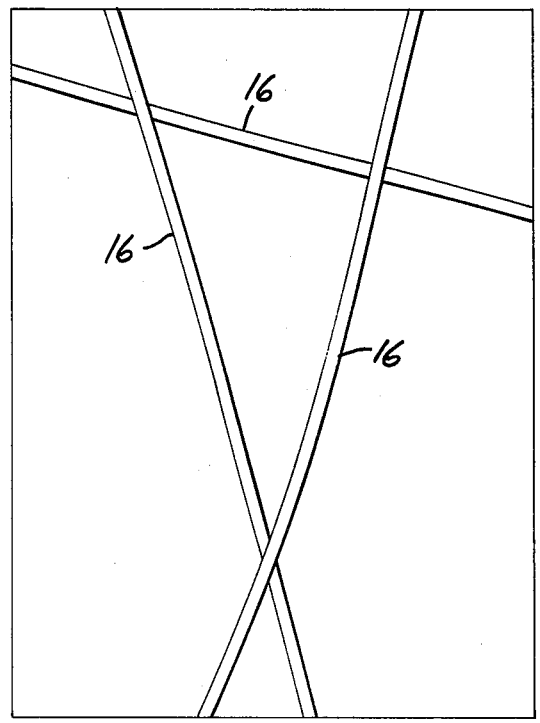

In the accompanying drawing:

FIG. 1 is a pen-and-ink sketch of solid, transparent, polycrystalline, anatase titanium dioxide refractory microspheres of this invention which are drawn to the same scale as a photomicrograph (200X) taken with a light or optical microscope, using oblique illumination;

FIG. 2 is a pen-and-ink sketch of solid, transparent, polycrystalline, anatase titanium dioxide refractory fibers of this invention fired to 550° C. which are drawn to the same scale as a photomicrograph (150X) taken with a light or optical microscope using incidental and transmitted light; and FIG. 3 is a pen-and-ink sketch of solid, opaque, polycrystalline, rutile titanium dioxide refractory fibers fired to 800° C. under the same conditions as those of FIG. 2 and drawn in a like manner.

Turning attention first to the refractory fibers of this invention, they can be made from an aqueous sol of colloidal titania formed by adding to acid (e.g., 37% concentrated hydrochloric acid) a tetraalkyl titanate of the formula Ti(OR)$_4$, where R is lower alkyl, e.g., with 1-8 carbon atoms, preferably 1-4 carbon atoms, such as tetraisopropyl titanate (the preferred titanate since it yields shaped and fired refractory fibers with superior physical and optical properties). Alkyl titanate compounds used in this invention are known in the art (see U.S. Pat. Nos. 3,460,956 and 3,395,203 where they are used in making flakes of titanium dioxide, useful as pigments). The titania sol can also be prepared by slowly adding titanium tetrachloride to water to obtain a clear solution, adding ammonium hydroxide to the solution to precipitate a titania hydrate, separating and washing the precipitate with water, and dispersing the precipitate in aqueous acid. Useful titania sols can also be made by dispersing colloidal titania in water admixed with such water-miscible, readily volatile, polar organic solvents as methanol, isopropanol, ethylene glycol, dimethylformamide, and various glycol ethers sold under the trademark "Cellosolve." The use of such organic solvents, however, is not preferred since such use increases the costs of operating.

The titania sols which are used to form the refractory fibers of this invention can also contain one or more other water-soluble or -dispersible metal compounds (calcinable in air to metal oxides) or other metal oxide sols as additives to impart internal color to the final refractory fibers or modify properties thereof, such as refractive index, coefficient of expansion, and the temperature at which anatase $TiO_2$ transforms to rutile $TiO_2$. For example, ferric nitrate can be added to an aqueous titania sol to impart a red to orange to gold color to the final refractory product; chromium diformate, trioxide, or chloride to impart a reddish or amber color; cobalt acetate or chloride to impart a green color; calcium acetate to impart a yellow color; nickel acetate to impart a light yellow or gold color; and copper chloride to impart a light green. The ferric oxide-containing refractory can be reduced in a hydrogen atmosphere, the resulting reduced iron oxide or iron imparting a black color to the refractory and making it attractive to a magnet. Silicon compounds calcinable to silica, $SiO_2$, or aqueous colloidal silica sols, can also be added to the titania sol, and for purposes of this application they are included in the term "additive metal compounds or oxides." Particularly useful aqueous colloidal silica dispersions or sols which can be used are those available under the trademark "Ludox." The amount of said additive metal compounds or oxides added to the titania sol can vary, depending on their function, but generally the amount to be added will be 0.5 to 10 weight percent, or even up to 50 weight percent, based on the total weight of the final refractory fiber product.

The titania sol as prepared generally will be relatively dilute and a sample of it generally will contain the equivalent of about 10 to 40 weight percent titania solids when calcined in air at 600°–800° C. Generally where fibers are to be made from the sol, it will be desirable to concentrate or otherwise viscosify the titania sol so that it will readily gel (i.e., hold its shape as a fiber sufficiently for further handling) when extruded and drawn in air. The titania sol preferred in the practice of this invention is made by freshly preparing a titania sol from a mixture of tetraalkyl titanate and acid. Acids which are useful are hydrochloric acid (the preferred acid), nitric acid (diluted with ethanol to prevent a violent reaction of it with the titanate), lactic acid or acetic acids (though organic acids are not preferred since their use means just that much more organic material will have to be removed in subsequent firing). The fresh sol is dried sufficiently to form a clear, firm gel comprising titanium dioxide, and the gel is then dispersed in water. The dispersion can then be concentrated to form a highly viscous fiberizable aqueous sol of titania. Where the titania sol is prepared from titanium tetrachloride, it can be mixed with an organic viscosifier, such as corn syrup or polyvinylpyrrolidone, and the mixture can then be concentrated for fiber formation.

Preferred aqueous colloidal sols which can be used to form fibers of this invention are those formed by adding about 5 parts by weight of tetraisopropyl titanate (TIPT) to about 1 part by weight of 37% concentrated hydrochloric acid, sufficiently evaporating water, HCl, and other volatiles at ambient temperature (20°–35° C.) or lower (using evacuation, e.g., as with a water aspirator) to form a firm gel which contains about 58 to 65 weight percent $TiO_2$, 12 to 20 weight percent HCl, 10 to 30 weight percent $H_2O$, and a small amount (e.g., 0.1 to 2 weight percent) organic material, and redispersing the gel in water to form a clear sol using about 4 parts water to 1 part gel. In some cases, it may be desirable to filter the titania sols to remove large colloids or extraneous particles.

The concentration of the titania sol for fiber formation can be carried out by techniques known in the art, various details as to the preferred techniques being disclosed in U.S. Pat. No. 3,709,706. For example, the sol can be concentrated with a "Rotavapor" flask under water-aspirator vacuum, the vacuum adjusted to prevent or minimize frothing or loss of the sol. Sufficient concentration will be obtained when the equivalent solids content of a calcined sample in 35 to 55 weight percent titania solids and the viscosity (Brookfield at ambient room temperature) of the concentrate is in the range of 15,000 to 1,000,000 cps., preferably 45,000 to 500,000 cps. The size of the colloidal titania particles in the concentrated sol will generally be below 10 millimicrons in diameter. The viscous concentrates are relatively stable but low temperature storage or refrigeration may be preferred if the concentrate is not to be used shortly after preparation, e.g., within 24 hours. Prior to extrusion, the concentrate can be centrifuged to remove air bubbles. The particular equivalent solids content or viscosity used for fiber formation will be dependent on the particular apparatus and conditions used to extrude the viscous concentrate. For example, when the viscous concentrate is extruded under pressure, e.g., 3.5 to 70 $kg./cm^2$, using a conventional spinnerette with a plurality of orifices (e.g., 15 to 1,000 or more orifices with diameters of 0.025–0.25 mm.), such as used in the rayon industry, the viscosity of the concentrate should be such that fibers are formed in a continuous manner without breaking of the extruded fiber as it is formed.

The extruded green fibers formed by this invention can be allowed to fall in air by the force of gravity or drawn mechanically in air by means of rolls or a drum or winding device rotating at a speed faster than the rate of extrusion, or the concentrate can be extruded through orifices from a stationary or rotating head and blown by parallel, oblique or tangential streams of air, such as in the making of cotton candy, the blown fibers being collected on a screen or the like in the form of a mat. Any of these forces exerted on the extruded fibers, e.g., gravity, drawing, or air streams, cause attenuation or stretching of the fibers, reducing their cross-sectional area by about 50 to 90 percent or more and increasing their length by about 100 to 1,000 percent and serve to hasten or aid the drying of the fibers.

The dehydrative gelling of the green fibers is carried out in ambient air or heated air can be used if desirable or necessary to obtain faster drying. The relative humidity of such air should not be too high, since large amounts of moisture will prevent drying and cause the gelled green fibers to stick together. Generally, relative humidity in the range of 20 to 60 percent can be used, at temperatures of 15° to 30° C. If the humidity is high and must be tolerated, compensations can be made by using a concentrate with a greater equivalent solids content or a higher viscosity, extruding at a lower rate, using a lower drawing rate, using a smaller extrusion orifice, exposing the green fibers to heated air as they are formed, and/or increasing the distances between the extrusion orifice and the point where the individual extruded fibers come into contact. On the other hand, if the relative humidity is too low, e.g., 10 to 15 percent, or lower, the green fibers may dry too fast and they will tend to break or fracture during spinning or handling before they can be fired. Low humidity conditions may be compensated for by extruding at a faster rate, using larger extrusion orifices, decreasing the distance between the orifices and the point where the fibers come into contact with one another or the drawing rolls, and/or using concentrates with lower equivalent solids content or lower viscosities. Air currents should be minimized or controlled because they may cause the individual extruded fibers to come into contact before they are sufficiently dry or cause fiber breakage. A thin coating of grease, lubricant, or sizing, such as "Halocarbon" 25-5S (halogenated polychlorotrifluoroethylene thickened with silica gel) or "ANTIFOAM A SPRAY" (silicone defoamer) can be applied to the face of the spinnerette to minimize the sticking of the concentrate or extruded fibers to the spinnerette face. In any event, the extruded fibers should be made or handled under conditions which will prevent or minimize their contact with one another before they are sufficiently dry to prevent sticking.

The green fibers can be brought into contact to form a strand of multi-fibers and the strand can be sized to hold the fibers together without fiber-to-fiber bonding. Where a size is used, the strand (or extruded fibers) can be mechanically drawn over a size applicator, like that used in the textile industry, and a conventional heat fugitive size or lubricant, such as oil, applied. Controlled rates of heating can be used to volatilize the size so as to avoid combustion of the size when the green fibers are fired, such combustion tending to cause overheating of the fibers (i.e., the temperature and rate of temperature rise caused by combustion may be higher than desired). The size may also require longer firing to completely remove it from the fired fiber.

When the shaped green articles are fired in air to convert them into refractories, the titanium dioxide content is polycrystalline, i.e., composed of a plurality of crystallites, the size of the crystallites being generally less than 1,000 angstroms and being distinguished from macrocrystals or "whiskers," which are single crystals measured in terms of millimeters or centimeters.

Further detail on the extruding of fibers from the viscous concentrate will be omitted here in the interest of brevity since applicable shaping procedures are known in the art, reference being made to U.S. Pat. No. 3,709,706, Belgium Pat. No. 779,966, and Chapter 8 of "Modern Composite Materials" text, supra, which illustrates and describes apparatus which can be used in this invention to form fibers from viscous concentrates.

The fibers in the green or unfired gel form generally comprise about 60 to 80 weight percent equivalent metal oxide solids (when calcined in air, e.g., at 600°–800° C.) and are dry in the sense that they do not adhere or stick to one another or other substrates and feel dry to the touch. However, they still contain substantial amounts of water, acid and organics, e.g., 20 to 40 weight percent, and it is necessary to heat and fire the green fibers in order to remove these remaining fugitive materials and convert the green fibers into refractory fibers.

In order to remove the balance of water, acid and organics from the green fibers and convert them to refractory fibers, they are heated, e.g., in a furnace, kiln, or the like in air or other oxygen-containing atmosphere, or in special cases, in a neutral or reducing atmosphere, at a moderately high temperature of up to about 600° C. Heating the green fibers to about 600° C. results in a fiber of polycrystalline anatase titanium dioxide, as determined by X-ray analysis. Above 600° C. and in the range of 650°–750° C., the titanium dioxide undergoes a transformation from the anatase form to the rutile form, the refractory changing from a transparent, clear, glossy material to an opaque or translucent whitish material. Upon further heating to about 1,000°–1,300° C., the crystallite grain size of the rutile titanium dioxide increases, the material becoming clear and the crystallites growing at a rapid rate to about 5–10 microns or greater in thickness. Incorporation of additives for color or other effects may cause an increase in the transformation temperature from transparent anatase to opaque or translucent rutile. For example, the presence of silica in a mixture of $TiO_2$-$SiO_2$ in amounts of 0.6, 6.25, and 13 weight percent shifts the anatase-to-rutile transformation to about 800°, 900°, and 1,100° C., respectively (i.e., the anatase form is retained up to at least 800°, 900°, and 1,100° C., respectively). However, opaque or translucent rutile can be transformed to clear rutile upon heating to a higher temperature.

Firing can be accomplished in a number of ways, for example by heating in a single step to a desired temperature or by heating in a series of steps at progessively higher temperatures, with or without cooling or storage between steps. The green fibers can be fired in the form of individual fibers or collected in a regular or random order and heated, or heated in the form of strands (a plurality of untwisted, parallel-aligned fibers), or fired in the form of hanks (a bunch of fibers or strands), or they can be chopped in the form of staple and fired in that manner. Also, the green strands or fibers can be twisted to form yarn and fired as such or can be woven to form a cloth and heated in the latter form. In order to ensure the production of continuous refractory fibers with lengths as great as 3 to 6 meters or longer, the green fibers are preferably heated in the form of a multi-fiber strand which is accumulated or collected in a loose, relaxed, unrestrained or slack configuration, such as offset or superimposed loops, as disclosed in said Belgium Pat. No. 779,966.

In firing the green fibers, ignition of combustible material in or evolved from the fibers should be avoided since such ignition may cause a rapid rise in temperature or a catastrophic evolution of volatiles, resulting in the formation of opaque, fragile fibers. Ignition may be avoided, for example, by starting out at a low temperature, e.g., room temperature, and elevating the temperature at a controlled rate. If the green fibers are not to be fired completely in one operation or are not to be fired immediately or soon after their formation, it may be desirable or necessary to store the fibers in a relatively dry or protective atmosphere to prevent them from picking up moisture or contaminants and deteriorating or sticking together.

As indicated by thermogravimetric and differential thermal analyses, the firing step volatilizes the balance of $H_2O$ and acid, decomposes and volatilizes organic material, and removes carbon, the resultant fiber being homogeneous and refractory. This firing step also causes some shrinking of the fiber, the amount of linear shrinkage being generally 25 percent or more, and the volume shrinkage being generally 50 percent or more. However, the fibrous shape of the article during firing remains intact and fibers when so fired are still of essentially continuous length. Rather than firing the green fibers in air to remove water, acid and organics, they can be heated in an autoclave in an inert atmosphere (e.g., 7 to 140 kg./cm$^2$ helium, argon, or nitrogen), for example at 300° to 500° C., in order to increase their porosity. Then, they can be refired in air to remove carbon, e.g., at 500° to 600° C. or more, and convert them into porous refractories.

The titanium dioxide in refractory fibers resulting from firing the green fibers in air at about 600° C. is polycrystalline in nature, the crystallites being generally less than about 1000 angstroms in size, and usually less than 500 angstroms. Such polycrystalline fibers are clear, glossy, smooth, uniformly curvilinear in shape, colorless (unless colorants are deliberately incorporated), and, when the titanium dioxide is present in predominantly its anatase form, are transparent to visible light. They are flexible and have useful strength and can be handled without breakage, the refractory fibers generally having a tensile strength of 7000 kg/cm$^2$ or higher and a modulus of elasticity of about $1 \times 10^6$ to $3 \times 10^6$ kg/cm$^2$ or higher.

The polycrystalline refractory fibers are continuous and generally have a rounded or ovoid cross section. The term "continuous fiber" as used in this application means a fiber (or multi-fiber article such as a strand) which has a length which is infinite for practical purpose as compared to its diameter. The continuous fibers of this invention, in green or refractory form, can be as long as 3 to 6 meters, or longer, fibers of shorter length than this arising only from occasional flaws due to minute inhomogenities, such as foreign particles or bubbles, stemming from their presence in the viscous concentrate precursor, or due to restraint during drying as by drying on a cylinder or from inadvertent mechanical fracture. By bringing a plurality of the fibers together in the form of a continuous strand, tow, yarn, or other multi-fiber article, the occasional breakage or fracture of a continuous fiber does not affect the practical utility of the multi-fiber article containing a fiber whose length is relatively short. In any event, the fibers of this invention, even if broken or fractured for reasons given above, can be made in lengths which are significantly longer than the length of a staple fiber.

Firing at low temperatures, e.g., 300° C., results in a porous refractory fiber. Because of the interconnected porosity of the refractory fibers, solutions of soluble metal compounds can be absorbed therein and dried and fired in air to convert the compounds to metal oxide deposits which enhance or change the color, index of refraction, modulus of elasticity, and magnetic or electrical properties of the fibers; by using this technique, the fired fibers can serve as a support for catalytic metals or metal oxides.

The solid refractory spherical particles or microspheres of this invention can be prepared from the same precursor sols used to make fibers, with or without additive metal compounds or sols thereof incorporated in the titania sols, by using the shaping and dehydrative gelling techniques and equipment of the prior art (e.g., U.S. Pat. Nos. 3,329,745 to LaGrange, 3,331,783 to Braun et al, 3,331,785 to Fitch et al, 3,340,567, 3,380,894 to Flack et al, and 3,709,706 to Sowman). (This type of dehydrative gelling can be considered in a sense as a solvent-extraction.) For this purpose, it is not necessary to concentrate the titania sol and it can have a variable equivalent solids content, for example, of 5 to 30 weight percent, and a viscosity, for example, of 10 to 30 cps. Rather, the sol can be dispersed in the form of small droplets in an organic dehydrating liquid having low water solubility (e.g., 1 to 30 volume percent), such as $C_4$ to $C_{10}$ alkanols, e.g., butanol, hexanol, ethylbutanol, and ethylhexanol. In order to ensure formation of the solid microspheres, the alcohol, such as butanol, may have to be nearly saturated or mixed with a minor amount of water, e.g., n-butanol mixed with 18 to 20 weight percent water, or used in anhydrous form, e.g., 2-ethyl-1-hexanol. These partially water-immiscible alcohols are preferred dehydrating liquids to be used in making the microspheres of this invention, and they have sufficiently low solubility for water that water is extracted from the dispersed droplets at a rate low enough to allow the droplets to dehydratively gel into solid microspheres of uniform surface and internal structure. The amount of dehydrating liquid used should be sufficient to prevent the droplets or spherical particles formed therein from sticking together. In the case of 2-ethyl-1-hexanol, the amount of water to be extracted in the dehydrating liquid is maintained at less than 2 volume percent. Alternatively, an oil, such as mineral oil, can be used as the dehydrating medium, such oil being heated, e.g., to 60°-90° C., to dehydrate the droplets dispersed in the heated oil.

Where the sol used to make the microspheres contains significant amounts of an alcohol which would be miscible with the dehydrating liquid, it will be necessary to remove sufficient alcohol from the sol so that the sol will be immiscible in the dehydrating liquid when dispersed therein. The above discussed procedure of drying freshly prepared sol and then redispersing the resulting gel in water will be particularly useful in preparing a sol for microsphere formation.

The addition of the sol to the dehydrating liquid can be made by injecting or jetting a stream of the sol into the body of the dehydrating liquid either above or below the surface thereof, for example, with a hypodermic needle. The dehydrating liquid is preferably agitated by stirring or swirling during the addition of the sol thereto. After addition of all of the sol to the dehydrating liquid, the mixture can be stirred further, for example, for 20 to 30 minutes, until the resultant spherical particles of the dispersion are sufficiently dehydrated and firm. The spherical particles can be separated from the dehydrating liquid, for example, by filtering or by centrifuging, and allowed to dry further in air (like the green fibers described above) at ambient room temperatures or higher, for example 60° to 80° C., to a solids content of about 60 to 80 weight percent. The particles can then be fired to convert them into hard refractory particles in the same manner described above for refractory fibers, e.g., fired in air at about 600° C. The particles in the green form or their fired form will generally be water clear, transparent and spherical under an optical microscope, and they can also be internally colored in the same way as described for the colored fibers by adding various water-soluble metal salts to the initial precursor liquid. Generally, the green and the fired spherical particles will have diameters in the range of 1 to 200 microns, usually 20 to 100 microns, depending upon the degree of agitation used in forming them, more vigorous agitation giving smaller spheres. The spheres will be solid and can be screen-classified to obtain fractions with desired diameters. The crystallographic identity of the microspheres will be the same as that described above for fibers fired under the same conditions.

Another technique for making green spherical particles is to spray-dry the precursor sol in a dilute or concentrated, non-viscous form. Atomizing of the precursor liquid can be carried out, for example, with pressure nozzles, the droplets or spheres as made descending in a countercurrent of dry air at ambient room temperature or in a flowing stream of warm air.

In describing refractory products of this invention as "transparent," this terms means that they have the property of transmitting rays of visible light. In the case of a transparent fiber, bodies beneath and contiguous to the fiber can be clearly seen through it, the outline, periphery or edges of contiguous bodies beneath the fiber being sharply discernible. In the case of microspheres, transparency thereof is indicated by the ability of the microspheres to function as the optical component in reflective sheeting made, for example, in accordance with U.S. Pat. Nos. 2,407,680 or 2,326,634. "Opaque" articles, on the other hand, are those which are impervious to light, e.g., the bodies or substrate beneath an opaque fiber are obscured and cannot be seen therethrough. The "translucent" articles are those which fall between transparent and opaque, and though translucent articles have the property of transmitting light to some degree, and therefore are somewhat or partly transparent, bodies beneath cannot be seen in a clearly distinguishable or sharp manner. Sometimes, because of vagaries in firing, an article or product may be a mixture of these various types of products, though generally one will be present in a predominant amount, indicative of the true nature of the mixture, the other products present in minor amounts having their particular appearance due to nonuniform firing conditions or due to localized overheating because of hot spots in the furnace or undesirable combustion.

Articles of this invention are preferably those refractory articles containing anatase titanium dioxide which are transparent, though for some particular applications, for example, where the article is used as a reinforcement for composites, transparency may not be important. The transparent quality of a refractory product of this invention is coincident with other desirable properties, such as strength and flexibility, and thus transparency can be considered in a sense as a gross measure of the quality of the refractory product. In some applications of the refractory products of this invention, e.g., where a fiber or bundle of fibers are used in fiber optics or where microspheres are used in reflective sign surfaces, transparency will be of special importance.

The refractory fibers of this invention are particularly useful in fabricating woven, felted, knitted, and other types of textiles such as braids. Such textiles generally will have the same properties, such as high strength, flexibility, refractoriness, and chemical resistance, as the fibers from which they are made. The refractory fibers colored with additive metal or metal oxides will find a particularly useful application in decorative fabrics, such as used in wall coverings. Fibers or yarns of this invention of different colors and/or compositions can be used together in making fabrics with decorative designs. Fibers or yarns of this invention can be plied or interwoven with fibers of other materials, such as metal fibers, silica fibers, carbon, graphite, polytetrafluoroethylene or fiberglass, if desired. Woven cloths made from the refractory fibers can be firmly bonded as wall covering to various substrates. For example, such cloths can be bonded with molten glass, or refractory cements such as zircon, aluminum oxide, phosphates, and silicates, to aluminum or other metal substrates and used as the interior wall coverings of airplanes. The woven cloths (or mats) can also be used as layups in plastic, metal or ceramic laminates. The fibers can be also bonded with such cements, as well as colloidal silica, to form flexible ceramic papers or mats useful as thermal insulation or preforms for reinforced resin composites.

The refractory fibers of this invention can be used in the form of fabrics, mats and batting as lightweight acoustical or thermal insulation for high temperature equipment, such as resistance and induction furnaces, and for purpose of heat shielding or reflecting, such as heating mantles and thermal curtains.

In their porous form, the refractory fibers are useful in filtering or absorption applications, for example, a filter to remove solids from hot gases, as a chromatographic column packing to selectively separate or resolve liquids or gases, or as catalysts or catalyst supports.

Another particularly useful application for the refractory products of this invention is that of reinforcement for structural plastic, elastomeric, metallic, or ceramic composites, especially those composites used in high temperature environments found in the aerospace industry, and in ablative environments. As composite reinforcement, the refractory products of this invention are preferably used in the form of fibers (either in continuous or staple form), though other particulate forms, such as microspheres, aggregates, and powders can be used for such purposes. The matrix materials which can be so reinforced include any of those heretofore used in making such composites, such as those disclosed in the above-cited "Modern Composite Materials" text and "Handbook of Reinforced Plastics," by Oleesky and Mohr, Reinhold Pub. co., N.Y. (1964). The plastics may be either of the thermosetting or thermoplastic types. Representative plastics which can be used include epoxy resins, polyester resins, acetal resins, acrylics, especially methyl methacrylate polymers, amino resins, especially urea-formaldehyde, and melamine-formaldehyde, alkyds, cellulosics, especially ethyl cellulose, cellulose acetate, and cellulose propianate, fluorocarbons, furanes, polyurethanes, phenolics, polyamides, polycarbonates, vinyl aromatics such as styrene, polyolefins, especially polyethylene, and the like. The refractory products of this invention can be made with a wide useful range of indices of refraction, e.g., about 1.8 to 2.6 or higher. In the form of particulate materials, the refractory products can be used as fillers and/or coloring agents or pigments for paints and enamels, such as water-based paints or alkyd-resin paints.

Metal matrix composites have had generally only limited application heretofore, one major reason being the lack of reinforcement materials which will withstand the elevated temperatures encountered in processing, e.g., casting and sintering temperatures. The refractory products of this invention, because of their thermal stability, strength, flexibility and other properties, are useful as reinforcements, particularly in their fiber form, for metal composites, such as shaped or cast articles made of aluminum, copper, magnesium, lead and nickel. Here, too, the prior art methods of incorporating reinforcements in metal matrix composites can be used, reference being made to "Fiber-Strengthened Metallic Composites," ASTM Spc. Tech. Pub. No. 427, published by the American Society for Testing and Materials, Philadelphia, Pa. (1967).

The refractory products of this invention can also be used as reinforcement for ceramic composites, such as silica, glass, aluminum silicate, and other inorganic materials, such reinforced ceramics being in the form of blocks, paper, and other shaped articles used in high temperature environments.

The refractory products of this invention can also be used as reinforcing agents (especially as fibers or in particulate form) for elastomeric materials, such as rubber, e.g., natural rubber, styrene-butadiene rubber, acrylonitrile-butadiene rubber, and neoprene, for example where such rubbers are used in making passenger-car or truck tires.

The objects and advantages of this invention are further illustrated in the following examples, but it should be understood that the particular materials used in these examples, as well as amounts thereof, and the various conditions and other details described, should not be construed to limit this invention. In these examples, all parts are by weight unless otherwise noted, the viscosities recited are Brookfield viscosities measured at ambient room temperature. In the examples, the firing of green articles and the firing of amorphous refractory articles to higher temperatures were all carried out by firing in air in an electric resistance furnace unless otherwise noted.

EXAMPLE 1

A sol was made by slowly adding tetraisopropyl titanate to 37% concentrated hydrochloric acid in the weight ratio of 5 parts tetraisopropyl titanate to 1 part acid. The aqueous resulting mixture was concentrated in a "Rotavapor" flask evacuated by water aspiration to a vacuum of 380–710 Torr. The resulting concentrate was a clear sol having a viscosity of about 50,000 cps and an equivalent $TiO_2$ solids content of 36.2 wt. %. The concentrate was allowed to stand at room temperature for 16 hrs. to eliminate bubbles. The sol was extruded into ambient air (22° C.) through a gold-platinum spinnerette having six holes (0.076 mm. diameter). The green fibers as spun were essentially continuous, smooth, round, flexible, shiny, clear and transparent, and were drawn in air and continuously wound on a variable speed takeup drum covered with polyester film. The green fibers so spun were essentially dry such that they did not stick together. The fibers were removed from the drum as a bundle and fired in air in that form in an electric furnace at 570° C. for 15 min. The refractory fibers so formed were continuous, smooth, round, flexible, transparent, and had an average diameter of about 12 microns and an average tensile strength of about 6,540 kg/cm². The titanium dioxide of the fibers was polycrystalline and in the anatase form.

EXAMPLE 2

Five parts tetraisopropyl titanate was added slowly to 1 part 37% conc. HCl cooled in a water bath. The resulting sol was dried in air at room temperature to a gel containing approximately 63 wt. % $TiO_2$ determined by calcination of a sample. A clear sol was made by adding 251 parts of the gel to 1,000 parts water and stirring. The sol was filtered through No. 54 "Whatman" filter paper yielding a light yellow sol having a pH of less than 1.0. The filtered sol was concentrated using a water-aspirated "Rotavapor" flask (under a vacuum of 710 Torr) to form a clear, yellowish concentrate having a viscosity of 140,000 cps.

A portion of the concentrated sol (452 grams) was extruded under 39 kg/cm² through a 30 hole gold-platinum spinnerette (with 0.076 mm. diameter holes). The fibers were spun into ambient air (about 22° C.) and drawn for about 1.8 m. by and wound on a 61 cm. diameter drum at a linear rate of about 60 m./min. The green fibers were cut and removed from the drum as a bundle about 1.8 m. in length. The green fibers were continuous, round, smooth, glossy, clear, and transparent.

The green fibers were draped over a silica rod placed in an air atmosphere electric kiln and fired from room temperature to 550° C. in 3 hrs. and held at 550° C. for an additional 30 min.

The resulting fibers were continuous, flexible, strong, smooth, shiny, clear, transparent, round (average diameter 15 microns) and essentially colorless when observed at 48 magnifications with a stereoscopic microscope. The titanium dioxide in the fibers was polycrystalline (crystallite size predominantly in the range of 130–560 angstroms) and in the anatase form. The density of the fibers was 3.81 g/cc, which is essentially the theroretical density of anatase titanium dioxide. Modulus of elasticity values of several fibers ranged from about $1.05 \times 10^6$ kg/cm² to $2.8 \times 10^6$ kg/cm².

FIG. 2 shows the nature of the refractory fibers when they are immersed in microscope oil having a refractive index of 1.515. Fibers 12 are clear and transparent, the boundaries or outline of the underlying fiber being visible through the overlaying fibers at their intersections 13. The outline of the underlying fibers is sharp and clear although the outline of the underlying fibers may be diffracted. When 550° C.-fired fibers are fired to the high temperatures of 800° C., and the anatase titanium dioxide transformed to rutile titanium dioxide, they turn opaque as shown in FIG. 3 where the 800° C.-fired fibers 16 do not transmit light and underlying fibers are not visible through the top fibers.

A reinforced resin composite was made comprising 48 vol. % of the above-described 550° C.-fired fibers and 52 vol. % epoxy novolak resin. The fibers used in making the composite were sized by coating them, as they were oriented in straight parallel layers, with a mixture of 4.75 g. hexamethoxymethylmelamine ("Cymel" 301), 1.5 g. "PEI" 12 (polyethylene imine), 4.3 g. tetraisopropyl titanate, 225 g. diacetone alcohol, and 9 drops of concentrated $HNO_3$. The coated fibers were dried in air for two hours and heated overnight at 120° C. The layers of sized fibers were cut into strips (2.5 cm.×10 cm.) with the fibers aligned parallel to the length of the strips. The strips of sized fibers were plied with layers of epoxy novolak resin placed between and on the top and bottom of the outermost strips of sized fibers. The resulting laminate was heated to 177° C. in a steel die and pressed to 17.6 kg/cm², these conditions being maintained for 1 hr. The laminate was then maintained overnight at 138° C. The resulting composite (1 mm. thick) was found to have a cross-bending modulus of elasticity of $0.67 \times 10^6$ kg/cm².

EXAMPLE 3

A titania sol was made by adding 480 g. tetraisopropyl titanate cautiously into 100 g. conc. (37%) HCl with stirring. This sol was refrigerated at about 5° C. overnight, removed and allowed to return to room temperature. To this sol, 4.53 g. ethyl silicate, having an equivalent $SiO_2$ content of 28.8 wt. %, was added with stirring to disperse. The sol mixture was concentrated in a "Rotavapor" flask under water aspirator vacuum to a viscosity of 114,000 cps. and centrifuged to remove air bubbles. Fibers were formed by extruding the concentrate at a pressure of about 14–21 kg/cm$^2$ through a 30-hole gold-platinum spinnerette having 0.076 mm. diameter holes. They were drawn by and collected continuously on a 15 cm. diameter drum located about 1 m. below the spinnerette. The coil of green fibers was removed and fired in air from room temperature to 500° C. over a period of about 45 min. The fired polycrystalline anatase $TiO_2$ fibers were transparent, clear, shiny, round, and continuous. The fiber composition was calculated to be 99 wt. % $TiO_2$ and 1 wt. % $SiO_2$.

EXAMPLE 4

Forty g. of a gel containing the equivalent of 62 wt. % $TiO_2$, made according to the procedure described in Example 2, were dispersed in 200 g. water. To this sol, 0.75 g. of chromium acetate, containing the equivalent of 34 wt. % $Cr_2O_3$, was added, the equivalent solids in the mixture being present in the ratio of 99 parts $TiO_2$ to 1 part $Cr_2O_3$. The mixture was stirred for 1 hr., filtered through a 0.5 micron "Millipore" filter, and concentrated in a 250 ml. "Rotavapor" flask, rotated in a water bath at 25°–40° C. under water aspirator vacuum. A clear, dark green concentrate resulted which was permitted to sit overnight. Viscosity increased markedly and 10 g. $H_2O$ was added and blended with the concentrate by rotation of the "Rotavapor" flask without evacuation until homogenized. The diluted mixture was concentrated again by evacuation to a fiberizable mass and extruded through a 6-hole gold-platinum spinnerette with 0.076 mm. diameter holes. The fibers were drawn by and collected on a 15 cm. diameter drum located about 1 m. below the spinnerette. The dry green fibers had a greenish tint and were clear.

The dry coil of fibers was cut and removed from the drum. One bunch of the fibers was inserted and suspended in an air atmosphere furnace at 100° C. and heated up to 600° C. in 45 min. The fired fibers of polycrystalline anatase $TiO_2$ and $Cr_2O_3$ were shiny, coppery-bronze to the unaided eye, amber under the microscope, clear, and transparent. Fiber diameters were mostly about 15 to 20 microns. Tensile strength of the 600° C.-fired fibers averaged about 4600 kg/cm$^2$.

Part of the fibers which had been fired to 600° C. were further fired in air to 800° C. These further fired fibers were opaque and greenish-gray in color, the $TiO_2$ being in the rutile form.

EXAMPLE 5

A titania sol was made by dispersing 150 g. of gel containing 62.4 wt. % $TiO_2$ equivalent, made according to the procedure described in Example 2, into 1200 g. water. A chromic acid solution, made by dissolving 11.2 g. $CrO_3$ in 30 g. water, was stirred together with the titania sol and the mixture filtered through a #54 "Whatman" filter paper. The resulting filtered sol was concentrated in a "Rotavapor" flask with water aspirator vacuum to a clear, orange-red color and an estimated viscosity of about 60,000 cps. This concentrate was extruded through a 30-hole gold-platinum spinnerette with 0.076 mm. diameter holes at a pressure of about 32 kg/cm$^2$ and the extruded filaments were drawn by and accumulated on a 61 cm. diameter reel at a linear rate of 76 m./min. The reel was located about 1.8 m. below the spinnerette.

The coil of fibers was cut into a single bundle length of about 1.8 m. and this bundle divided into seven different tows or bundles which were then draped over a horizontal silica rod and dried at 50° C. overnight. Fiber bundles were fired from 50° C. to various higher temperatures, and samples removed at 300°, 400°, 500°, 600°, 700°, 800°, and 1000° C. and their appearance noted. The following table summarizes the results.

TABLE I

| Firing Temp. °C. | Time lapse from start at 50° C., min. | Visual Appearance to eye | Appearance with stereoscopic microscope at 140X |
| --- | --- | --- | --- |
| 50 | 0 | yellow color | — |
| 200 | 40 | reddish brown | — |
| 300 | 75 | reddish purple | transp.*, clear-dark red |
| 400 | 140 | purple | transp., clear-red purple |
| 500 | 180 | darker purple | transp., clear-dark red |
| 600 | 255 | purple | transp., clear-dark red |
| 700 | 315 | grey-green | transp., clear-red-green |
| 800 | 350 | duller than at 700° C. | mostly opaque and grainy |
| 1000 | 390 | dull green | opaque and grainy |

*"transp." means transparent

The composition of the fired titanium dioxide-chromia fibers was calculated to be 91.7 wt. % $TiO_2$ and 8.3 wt. % $Cr_2O_3$.

EXAMPLE 6

A titania sol was made by dispersing in 200 g. water 40 g. of gel prepared according to the procedure of Example 2 with an equivalent $TiO_2$ content of 61.5 wt. %. To this sol, 0.75 g. chromium acetate having 34 wt. % equivalent $Cr_2O_3$ content and 1.0 g. of gamma-aminopropyltriethoxysilane (Union Carbide A-1100) with an equivalent of 26.8 wt. % $SiO_2$ were added and stirred until dispersed. The resultant dispersion was filtered through a 0.5 micron filter and a clear, green mixture resulted. This liquid was concentrated in a "Rotavapor" flask under water aspirator vacuum to a viscosity of about 100,000 cps, the resultant concentrate having an equivalent total oxide solids content of about 54.4 wt. %. Fibers were readily formed by inserting and withdrawing a glass rod. The concentrate was extruded at 17.6 kg/cm$^2$ pressure through a gold-platinum spinnerette having 0.076 mm. diameter holes and the extruded fibers were continuously drawn by and collected on a 15.24 cm. diameter drum located 1 m. below the spinnerette at a rate of 21 linear m./min. Several coil bundles were collected and removed from the drum.

Separate samples of the dry fibers were fired by suspending in an air-atmosphere furnace and firing to 350°, 700°, 750°, 800°, 850°, and 900° C. About 1 to 1¼ hrs. were required to reach 700° C. The fired composition of the fibers was calculated to be equivalent to 98 wt. % $TiO_2$, 1 wt. % $SiO_2$, and 1 wt. % $Cr_2O_3$. Results are shown in the following table, the densities of the 700°, 750° and 850° C.-fired fibers being 3.18, 3.40 and 3.52 g/cm$^3$, respectively.

TABLE II

| Firing Temp. °C. | Visual Appearance | X-ray Diffraction Analysis*** | Tensile kg/cm²* | Modulus of elasticity kg/cm² × 10⁶ |
|---|---|---|---|---|
| 350 | clear, gold color, transp., shiny, continuous | — | 1550 | 0.48 |
| 700 | clear, copper-gold color, transp., shiny, continuous | anatase, <900A | 6000 | 0.99 |
| 750 | same as 700° fibers | anatase, <1000A | 4360 | 0.93 |
| 800 | same as 700° fibers | anatase, <1000A | 5100 | 1.38 |
| 850 | same as 700° fibers but darker and clear amber color | anatase <1000A | 7380 | 1.42 |
| 900 | shiny, brown, translucent, stiff | predominantly anatase** | 8300 | — |
| 1080 | shiny, brown stiff, opaque | rutile >1000A | — | — |

*Fiber test specimens were 15–17 μ in diameter and 2.54 cm in length
**The relative intensity of anatase was 100 and rutile was 5.
***Crystallite size is estimated by line broadening.

EXAMPLE 7

A titania sol was made by dispersing 30 g. of a gel made according to Example 2 with an equivalent of 61.5 wt. % $TiO_2$, into 60 g. of anhydrous methyl alcohol. This sol was mixed with an alumina sol made by dispersing 7.5 g. alpha-alumuna monohydrate ("Dispal"-M) into 92.5 g. water and about 0.75 g. con. HCl (37%). Forty g. of white syrup ("KARO") were added to the mixed sols to assist in fiber forming. The dispersion was concentrated in a "Rotavapor" flask to a fiberizable mass (determined by withdrawing glass rod) and extruded at a pressure of 14 kg/cm² through a gold-platinum spinnerette with six holes (0.076 mm. diameter). The extruded fibers were drawn downward by and collected on a 15 cm. diameter drun. A heat lamp was used to dry fibers before collection on the drum. The dry coil was removed and fired in air to 550° C. The fired fibers were predominantly clear, transparent, and shiny and the only polycrystalline species found by X-ray analysis was anatase $TiO_2$ with a crystallite size estimated to be less than 1000 A. The composition of these fired fibers was calculated to be about 76.0 wt. % $TiO_2$ and 24.0 wt. % $Al_2O_3$.

EXAMPLE 8

A $TiO_2$ sol was made by dispersing 15 g. dry gel (made as described in Example 2) in 60 g. water. Microspheres were formed by injecting the sol with a hypodermic syringe into 3500 ml. of 2-ethyl-1-hexanol agitated by a laboratory stirrer at 1200 rpm. The dispersion of microspheres was stirred for 20 min., filtered through No. 54 "Whatman" paper, dried at 90° C., and then were heated in air from room temperature to 300° C. over a 3-hour period to give transparent, brown-colored, solid microspheres with diameters predominantly in the range of 50 to 100 microns. Portions of the fired microspheres were soaked in various aqueous solutions or sols of metal compounds, filtered, dried by heating to 90° C. for about 1 hr., and fired in air, and the refractive indices of the fired microspheres were measured. Control portions of the microspheres were fired without soaking to determine changes in refractive index due to the soaking treatment and firing temperature. The results are tabulated in Table III. Some of the microspheres were placed in the furnace at the desired firing temperature and others were placed in the furnace at room temperature (or, in one run, at 300° C.) and the temperature raised to the desired temperature. The aqueous solutions or sols of metal compounds, used for soaking the microspheres, contained the equivalent of 5 wt. % of metal oxide. Where the soaking media were $PbNO_3$ solution, $BaCl_2$ solution, and a $ZrO_2$ sol, and the microspheres soaked then fired from room temperature to 640°, 680°, and 700° C., respectively, the fired microspheres were found to contain 0.6, 0.15, and 0.3 wt. % of Pb, Ba, and Zr, respectively as determined by spectrographic analysis.

TABLE III

| | | | Fired Microspheres | |
|---|---|---|---|---|
| Metal compd. | Firing temp. °C. | Duration of firing | Stereoscopic Microscope Appearance | Refractive index |
| NONE | 525 | 15 min. | very clear, transp. | 2.36 |
| NONE | 580 | 20 min. | clear, transp. | 2.385 |
| NONE | 580 | 60 min. | clear, transp. | 2.385 |
| NONE | 640 | 15 min. | mostly clear, transp. | 2.42 |
| NONE | RT*–640 | 3 hr. | very clear, transp. | 2.59 |
| NONE | RT–720 | 4½ hr. | mostly clear, transp.** | 2.625–2.65 |
| $PbNO_3$ | 525 | 15 min. | very clear, transp. | 2.37 |
| $PbNO_3$ | 580 | 20 min. | clear, transp. | 2.41 |
| $PbNO_3$ | 580 | 60 min. | clear, transp. | 2.45 |
| $PbNO_3$ | 640 | 15 min. | mostly clear, transp. | 2.42 |
| $PbNO_3$ | RT–640 | 3 hr. | very clear, transp. | 2.525 |
| $PbNO_3$ | RT–720 | 4½ hr. | slightly diffuse | 2.64–2.67 |
| $BaCl_2$ | 300–575 | 1¼ hr. | clear, transp. | 2.37 |
| $BaCl_2$ | RT–650 | 2¼ hr. | mostly clear, transp.** | 2.515 |
| $BaCl_2$ | RT–680 | 4 hr. | very clear, transp. | 2.65 |
| $BaCl_2$ | RT–720 | 8 hr. | diffuse | 2.65 |
| $ZrO_2$ sol | 100–550 | 2 hr. | very clear, transp. | 2.39 |
| $ZrO_2$ sol | 620 | 20 min. | very clear, transp. | 2.40 |
| $ZrO_2$ sol | RT–630 | 4 hr. | very clear, transp. | 2.525 |
| $ZrO_2$ sol | RT–700 | 3½ hr. | clear, transp. | 2.65 |
| $ZrO_2$ sol | RT–780 | 2 hr. | cloudy | — |

*"RT" means firing started at room temperature
**These fired microspheres were mostly clear and transparent but the fired product contained some microspheres larger than 50 microns which were slightly diffuse These data indicate that the refractive index is somewhat dependent upon the additive used for soaking the microspheres prior to firing but appears to be more dependent on the firing temperature.

EXAMPLE 9

A sol was made by adding 5 parts tetraisopropyl titanate to 1 part 37% concentrated HCl. The sol was coated on a polyester film and allowed to dry in air at room temperature. Ten g. of the dry gel, in the form of clear, transparent, colorless flakes, were dispersed in 23.3 g. of an aqueous colloidal silica sol ("Ludox" SM)

containing 15 wt. % SiO$_2$. The resultant mixed sol was calculated to contain the equivalent of 65 wt. % TiO$_2$ and 35 wt. % SiO$_2$. Four g. of this mixed sol were diluted with 4 g. water and the diluted sol was poured into 500 ml. 2-ethyl-1-hexanol which was being rapidly stirred. The resulting dispersion of microspheres was filtered and the recovered microspheres were dried in air at room temperature. The dried, transparent microspheres were fired in air from room temperature to 530° C. and held at the latter temperature for 15 min. The resultant fired solid microspheres were fairly clear, transparent, polycrystalline, with the titanium dioxide in the anatase form, and had a refractive index of 1.815. After firing in air further from room temperature to 630° C. and holding at 630° C. for 30 min., the microspheres were still fairly clear and transparent with no change in refractive index and the titanium dioxide was still in the anatase form, the microspheres having a diameter ranging from less than 30 microns to 100 microns. A similarly prepared batch of dried microspheres was fired in air from room temperature to 730° C. and held at that temperature for 30 min.; these fired microspheres were also transparent, fairly clear, and had an index of refraction of 1.815, the titanium dioxide also being present in the anatase form.

EXAMPLE 10

About 2.5 g. of a dry gel, containing the equivalent of 61 wt. % TiO$_2$ and made according to the procedure of Example 2, were dispersed into 9.24 g. of an aqueous colloidal silica sol ("Ludox" SM) containing 15 wt. % SiO$_2$. The mixed sol was poured into 750 ml. 2-ethyl-1-hexanol which was being rapidly stirred and the stirring continued for 20 min. The resulting dispersion of solid microspheres was filtered and the recovered microspheres were dried. The dried microspheres were transparent, clear and colorless. They were fired in air from room temperature to 600° C., held at that temperature for 15 min. and further fired to 1000° C. and held at that temperature for 30 min. The resultant fired solid microspheres were transparent, slightly cloudy and had an index of refraction of 1.75 to 1.76, and they had a calculated composition of 52.5 wt. % TiO$_2$ and 47.5 wt. % SiO$_2$, with the titanium dioxide being in the anatase form.

EXAMPLE 11

Forty g. of TiO$_2$ gel (containing the equivalent of 24 g. TiO$_2$), prepared by the procedure described in Example 2, were dispersed in about 80 g. water. To this sol, 5.65 cc. of aqueous ferric nitrate solution (equivalent to 1.2 g. Fe$_2$O$_3$) was added. The resulting dispersion was concentrated for several hours in a "Rotavapor" flask under water aspirator vacuum to a fiberizable mass determined by inserting and withdrawing a glass rod. The concentrated sol was extruded through a six-hole die (with 0.076 mm. diameter holes) at a pressure of 4.9–5.6 kg/cm$^2$. The extruded fibers were continuously drawn on a 15 cm. diameter wheel at the linear rate of 18 to 37 m./min.

The green fibers were removed from the wheel. One bundle of the fibers was fired in air from RT to 500° C. and another bundle of fibers fired in air from RT to 550° C. The fibers were calculated to contain 95.2 wt. % TiO$_2$ and 4.8 wt. % Fe$_2$O$_3$. The fibers of both fired bundles were continuous, round, shiny, transparent, clear, and gold in color (the fibers fired to 550° C. being a darker gold color). Some of the fibers were further fired in air to 750° C. and the resulting fibers were red-brown in color and opaque. The titanium dioxide in the 550° C.-fired fibers was in the anatase form and that in the 750° C.-fired fibers was in the rutile form.

A sol was formed in a similar manner containing the equivalent of 40 wt. % TiO$_2$. To 10 ml. of this concentrate, containing the equivalent of 5.6 g. TiO$_2$, 1 g. of Co(NO$_3$)$_2$.6H$_2$O dissolved in a small amount of water was added. The resultant viscous concentrate was extruded at 4.9–5.6 kg/cm$^2$ through a die with six 0.076 mm. holes and the fibers drawn at about 27–30 m./min. One bundle of the resulting fibers was fired at 350° C. for ½ hr. and then refired at 500° C. for ½ hr. The resulting fibers were continuous, round, shiny, transparent and green in color, with the TiO$_2$ in the anatase form. Another bundle of the fibers fired from room temperature to 500° C. produced similar fibers which were olive green in color and about 15 microns in diameter. Another bundle fired to 750° C. produced fibers which were opaque and ocean-green in color, the TiO$_2$ content being in the rutile form.

EXAMPLE 12

A bundle of the 750° C.-fired TiO$_2$—Fe$_2$O$_3$ fibers of Example 11 was fired in a hydrogen atmosphere to 700° C. and held at 700° C. for about ½ hr. and then cooled in the furnace to about 200° C. in the hydrogen atmosphere, and further cooled to room temperature in nitrogen. The resultant fibers were opaque, shiny black, stiff, magnetic and slightly electrically conductive, the fibers being composed predominantly of rutile TiO$_2$ with a small amount of alpha iron being present.

EXAMPLE 13

Green, porous, transparent titanium dioxide microspheres were formed (using the procedure of Example 8) from a TiO$_2$ sol (made from a titania gel as in Example 2) that contained about 30 wt. % TiO$_2$. The resulting green microspheres were fired in air at three different temperatures and the surface areas measured using the BET method. The data are given in Table IV.

TABLE IV

| Firing Temp. °C. | Firing Time (hr.) | Surface area (m$^2$/g) |
|---|---|---|
| 200 | 1 | 107.0 |
| 310 | 2 | 133.0 |
| 370 | 2 | 68.6 |

EXAMPLE 14

Sixty-five g. of a TiO$_2$ gel, made according to the procedure of Example 2, were dispersed in 260 g. water to form a TiO$_2$ sol, which was filtered through a 0.25 micron "Millipore" filter. Sixty g. of the filtered sol was poured slowly into the vortex formed in 3700 ml. of 2-ethyl-1-hexanol being stirred at 1240 rpm. in a 4-liter beaker. Stirring was continued for 20–25min. The dispersion of microspheres was filtered and the recovered microspheres were dried overnight at 80° C. The dried green microspheres were fired in air from room temperature to 530° C. over a 1 hr. period and held at 530 C. for 1 hr. The resulting solid, clear, shiny, microspheres had an average diameter of about 45 microns and had an average index of refraction of 2.32. The TiO$_2$ content of these fired microspheres was polycrystalline anatase. FIG. 1 illustrates what these fired microspheres look like under a light microscope, where they are designated by reference number 10 (reference number 11 denoting light spots caused by reflection from the illumination source on the surface of the microspheres and the shading shown by stippling).

EXAMPLE 15

A solution was made by dripping 504 g. TiCl$_4$ into 500 g. water being constantly stirred in a beaker and maintained at about 20° C. in a cold water bath, the reaction mixture being cooled to prevent elevation of the temperature due to the exothermic reaction. A clear yellow liquid resulted. To 481 g. of the solution, 350 ml. of water and 350 ml. of ammonium hydroxide (28–30% NH$_3$) was added with agitation, forming a thick white precipitate. Water was added to disperse the precipitate which was filtered off and washed repeatedly with water. The precipitate was then dispersed in water. A portion, 250 g. (containing about 10 wt. % TiO$_2$) of the dispersion was digested with 45 ml. of concentrated HCl over a period of 4 hrs. The resulting sol was filtered through No. 54 and then No. 50 "Whatman" filters. The filtered sol was slightly hazy and had a pH of about 0.5 with a TiO$_2$ content of about 8.6 wt. %. Three ml. of the sol were injected with a hypodermic syringe into 250 ml. 2-ethyl-1-hexanol and the dispersion of solid microspheres was stirred as in Example 8. The green, water-clear microspheres were recovered by filtration and dried in air at about 80° C. After firing from room temperature to 550° C. in about 1 to 1½ hrs., the microspheres were shiny, transparent and clear to slightly hazy. The fired microspheres averaged 45–60 microns in diameter and had a refractive index of 2.24.

EXAMPLE 16

Transparent and colorless polyester sheeting (0.10 mm. thick) is coated with a 30% solution of vinylidene fluoride-perfluoropropene fluorinated elastomer ("Viton" A) having an index of refraction of about 1.38 to 1.39, when cured to a thickness of about 0.015 mm. in methylisobutylketone, using a wire-wound bar (28 winds per cm.) to accomplish this coating. The coating is allowed to dry to a slightly tacky state and solid titanium dioxide microspheres, made as described in Example 14 (with diameters ranging from 15–30μ and an index of refraction of 2.58), are cascade coated onto and partially embedded in the tacky coating or web as a monolayer, and the assembly is then oven dried in air at 95° C. for 15 min. The exposed surfaces of the partially embedded microspheres are then vapor coated with aluminum to yield a composite sheeting of the type described in U.S. Pat. No. 2,407,680, the sheeting being retro-reflective to visible light when covered with water.

EXAMPLE 17

A glossy polyacrylate treated paper carrier web is knife-coated with a non-oxidizing alkyd resin solution (an oil-free, baking alkyd solution containing adipic acid, maximum acid number of 15, said solution containing about 68 wt. % resin solids and 32 wt. % aromatic solvent) to provide a wet coating of about 0.20 mm. thick. The resin is cured at 65° C. for 10 min. and then 120° C. for 10 min. A second coating (about 0.05 mm. thick) of the same alkyd resin solution is knife-coated on top of the first coating and allowed to become tacky by evaporation of the solvent at room temperature. Solid titanium dioxide microspheres made in accordance with Example 14 (having diameters ranging from 20–45μ and a reflective index of 2.30) are cascade coated on and partially embedded in the tacky resin as a monolayer and the assembly is then cured in place for 30 min. at 95° C. A xylol-butanol solution containing 20 wt. % polyvinyl butyral (having an index of refraction of about 1.50–1.53 when dry) was knife-coated directly over the microsphere coating to provide a final layer of resin (0.025–0.038 mm. in thickness). After this final layer was dried at 95° C. for 30 min., the resin surface is vacuum vapor coated with aluminum. The paper carrier web is striped from the assembly to yield a composite sheeting of the type described in U.S. Pat. No. 2,407,680 which is retro-reflective to visible light when covered with water.

EXAMPLE 18

A solution of a blend of 5 parts by weight of nitrile rubber (a high acrylonitrile-butadiene copolymer), 6.6 parts by weight of phenolic resin ("Durez" 14296), 1 part by weight of dioctyl phthalate plasticizer, and 2.9 parts by weight of aluminum powder in 16 parts by weight of methyl isobutyl ketone is knife-coated to a thickness of about 0.05 mm. onto a glossy polyacrylate treated paper carrier web, and the coating allowed to dry to a tacky state. Solid titanium dioxide microspheres made in accordance with Example 14 (the majority of the microspheres having a diameter of about 20–75μ and an index of refraction of 2.54) are cascade coated onto and partially embedded into the tacky resin and the assembly is cured in a 120° C. oven for 20 min. The resulting sheeting is retro-reflective when covered with water and is of the type described in U.S. Pat. No. 2,326,634.

Various modifications and alterations of this invention will become apparent to those skilled in the art without departing from the scope and spirit of this invention, and it should be understood that this invention is not to be limited to the illustrative embodiments set forth herein.

What is claimed is:

1. A transparent, solid, shaped and fired, non-vitreous, homogeneous, continuous refractory fiber comprising predominantly polycrystalline titanium dioxide in its anatase form.

2. Transparent, solid, shaped and fired, non-vitreous, homogeneous microspheres having diameters in the range of 1 to 200 microns and comprising predominantly polycrystalline titanium dioxide in its anatase form.

3. The microspheres of claim 2 further comprising one or more of other metal oxide.

4. A plastic, elastomeric, metallic or ceramic composite with a plurality of microspheres of claim 2 distributed therein.

5. A solid, shaped and fired, non-vitreous, homogeneous, transparent, continuous refractory fiber comprising predominantly polycrystalline titanium dioxide in its anatase form, and one or more other metal oxides.

6. The fiber of claim 5, wherein said other metal oxide is chromium oxide.

7. The fiber of claim 5, wherein said other metal oxide is alumium oxide.

8. The fiber of claim 5, wherein said other metal oxide is iron oxide.

9. The fiber of claim 5, wherein said other metal oxide is cobalt oxide.

10. The fiber of claim 5, wherein said other metal oxide is silica.

11. The fiber of claim 5, wherein said other metal oxide is chromium oxide and silica.

12. A solid, shaped and fired, non-vitreous, homogeneous, transparent, continuous, refractory fiber comprising predominantly polycrystalline titanium dioxide in its anatase form, and one or more other metal oxides selected from the group consisting of chromium oxide, aluminum oxide, iron oxide, cobalt oxide, and silica.

13. A solid, shaped and fired, non-vitreous, homogeneous, transparent, continuous, refractory fiber comprising predominantly polycrystalline titanium dioxide in its anatase form, and one or more other metal oxides present in an amount sufficient to impart a color to said fiber.

14. Transparent, solid, shaped and fired, non-vitreous, homogeneous microspheres comprising predominantly polycrystalline titanium dioxide in its anatase form and one or more of the oxides of silicon, chromium, aluminum, iron, and cobalt.

15. A method for forming continuous fibers of solid, transparent refractory comprising predominantly polycrystalline titanium dioxide in its anatase form, which method comprises extruding in air an aqueous acidic titanium oxide sol or aqueous acidic mixture of a titanium compound calcinable in air to titanium dioxide, and heating and firing the resulting amorphous fibers to remove water, acid, organic material, and carbon therefrom and form said continuous fibers.

16. A method according to claim 15 wherein the material which is extruded to form said amorphous fibers is a viscous, fiberizable concentrate comprising an aqueous titanium dioxide sol prepared by dispersing in water a gel formed by drying an acidified aqueous mixture of tetraalkyl titanate.

17. A method according to claim 16 wherein said firing is carried out at a temperature up to about 600° C.

18. A method according to claim 15 wherein the material which is dispersed as said droplets to form said amorphous microspheres comprises an aqueous titanium dioxide sol prepared by dispersing in water a gel formed by drying an acidified aqueous mixture of tetraalkyl titanate.

19. The method according to claim 18 wherein said tetraalkyl titanate is tetraisopropyl titanate.

20. The method of claim 16 wherein said tetraalkyl titanate is tetraisopropyl titanate.

21. The method of claim 16, wherein said aqueous mixture of said tetraalkyl titanate further comprises a further metal oxide or metal compound which is calcinable in air to its corresponding metal oxide and the resulting shaped and fired refractory article further comprises said metal oxide.

22. The method of claim 21 wherein said metal oxide is silica.

23. The method of claim 21 wherein said metal oxide is alumina.

24. The method of claim 21 wherein said metal oxide is chromia.

25. The method of claim 21 wherein said metal oxide is chromia and silica.

26. A method for forming refractory microspheres of solid transparent refractory comprising predominantly polycrystalline titanium dioxide in its anatase form, which method comprises dispersing as droplets in an organic dehydrating liquid an aqueous acidic titanium oxide sol or aqueous acidic mixture of a titanium compound calcinable in air to titanium dioxide, recovering the resulting amorphous microspheres from said liquid, and heating and firing said recovered microspheres to convert them to said refractory microspheres.

27. In a retro-reflective sheeting comprising a monolayer of spherical lense elements and associated reflector adapted in combination therewith to provide retro-reflection, the improvement comprising using as said lense elements transparent, solid, shaped and fired microspheres comprising predominantly polycrystalline titanium dioxide in its anatase form.

28. A plastic composite comprising a plastic matrix having dispersed therein a plurality of solid, shaped and fired, non-vitreous, homogeneous, refractory fibers comprising predominantly polycrystalline titanium dioxide in its anatase form.

* * * * *